United States Patent
Aoki

(10) Patent No.: US 8,074,760 B2
(45) Date of Patent: Dec. 13, 2011

(54) ARM MEMBER AND STRADDLE-TYPE VEHICLE

(75) Inventor: Kazushige Aoki, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 11/961,074

(22) Filed: Dec. 20, 2007

(65) Prior Publication Data

US 2008/0156565 A1 Jul. 3, 2008

(30) Foreign Application Priority Data

Dec. 28, 2006 (JP) ................................. 2006-356600

(51) Int. Cl.
*B62K 25/28* (2006.01)
(52) U.S. Cl. ....................................................... 180/227
(58) Field of Classification Search .............. 280/283, 280/284, 285, 286, 288; 180/227; D12/110, D12/118
See application file for complete search history.

(56) References Cited

U.S. PATENT DOCUMENTS

| | | | | | |
|---|---|---|---|---|---|
| 571,941 | A | * | 11/1896 | Bolte | 280/288 |
| 2,433,631 | A | * | 12/1947 | Sherman | 244/100 R |
| 3,151,878 | A | * | 10/1964 | Uncles | 280/284 |
| 4,373,602 | A | * | 2/1983 | Tomita et al. | 180/227 |
| 4,445,585 | A | * | 5/1984 | Imani | 180/68.5 |
| 4,485,885 | A | * | 12/1984 | Fukuchi | 180/227 |
| 6,182,994 | B1 | * | 2/2001 | Gogo et al. | 280/284 |
| 6,219,919 | B1 | * | 4/2001 | Gogo et al. | 29/897.2 |
| 6,481,523 | B1 | * | 11/2002 | Noro et al. | 180/227 |
| 6,516,909 | B2 | * | 2/2003 | Gogo | 180/219 |
| 6,612,600 | B2 | * | 9/2003 | Devitt et al. | 280/288.3 |
| 7,281,726 | B2 | * | 10/2007 | Satou | 280/284 |

FOREIGN PATENT DOCUMENTS

| | | | | |
|---|---|---|---|---|
| GB | 2249065 | A | * | 4/1992 |
| JP | 01289787 | A | * | 11/1989 |
| JP | 04038285 | A | * | 2/1992 |
| JP | 05131964 | A | * | 5/1993 |
| JP | 05178262 | A | * | 7/1993 |
| JP | 05-060997 | | | 8/1993 |
| JP | 05310171 | A | * | 11/1993 |

* cited by examiner

*Primary Examiner* — Tony H. Winner
*Assistant Examiner* — Wesley Potter
(74) *Attorney, Agent, or Firm* — Keating & Bennett, LLP

(57) ABSTRACT

A rear arm for a straddle-type vehicle that satisfies rigidity requirements and is manufactured more easily. The rear arm includes a pair of arms that support end sections of a wheel axle, and a cross member that connects the arms. The cross member is formed by bending a singular tabular member. A rear end section of the cross member has a recessed shape that is recessed toward pivot members.

5 Claims, 8 Drawing Sheets

US 8,074,760 B2

ARM MEMBER AND STRADDLE-TYPE VEHICLE

RELATED APPLICATIONS

This application claims the benefit of priority under 35 USC 119 of Japanese patent application no. 2006-356600, filed on Dec. 28, 2006, which application is hereby incorporated by reference in its entirety.

BACKGROUND OF THE INVENTION

1. Field of the Invention

The invention relates to an arm member that is attached to a pivot member and supports a wheel of a straddle-type vehicle.

2. Description of Related Art

A straddle-type vehicle such as a motorcycle often has an arm member that rotatably supports a rear wheel. The arm member is generally formed by left and right arms to which a wheel axle is attached. A connecting (cross) member is provided between and connects the arms. The connecting member may include a plurality of members, namely, a bridging plate that connects the arms and a vertical rib that extends vertically from the bridging plate (for example, refer to JP-UM-A-5-60997, FIG. 2).

In addition, the arm member preferably is able to bend to a suitable extent when a load is applied thereto. To address this need, the shape of the arms (for example, the thickness) may be changed to adjust the rigidity of the arm member.

However, because the connecting member is formed from a plurality of members, the manufacturing process of the arm member is complicated. Changing the shape of the arms in accordance with rigidity requirements also increases manufacturing costs.

SUMMARY OF THE INVENTION

The invention has been devised in light of these circumstances and provides an arm member for a straddle-type vehicle that satisfies rigidity requirements and can be manufactured more easily.

An arm member according to a first aspect of the invention is attached to a pivot member of a straddle-type vehicle having a wheel having a wheel axle. The arm member supports the wheel axle and includes a pair of arms that support end sections of the wheel axle. A connecting member is disposed between and connects the pair of arms. The connecting member is formed by bending a single tabular member and has a rear end section with a recessed section that is recessed toward the pivot member in a plan view.

In the above-described arm member, the connecting member is formed by bending the singular tabular member. As a result, as compared to a connecting member formed using a plurality of members, the manufacturing process of the arm member is simplified.

In addition, the rear end section of the connecting member has a concave section that is recessed toward the pivot member. Accordingly, interference with the wheel axle is avoided, and the rigidity required of the arm member is ensured.

In one embodiment, the rear end section of the connecting member has an arch shape in the plan view.

In one embodiment, one end section of the tabular member is bent to abut in an abutting section against another end section of the tabular member. The abutting section may face the pivot member or may face the wheel axle.

In another embodiment, the abutting section extends between the arms.

In another embodiment, the abutting section is formed at a generally central position between top and bottom ends of the connecting member.

A straddle-type vehicle according to a further embodiment is provided with an arm member according to the first aspect of the invention.

An arm member according to a second aspect of the invention is attached to a pivot member of a straddle-type vehicle having a wheel having a wheel axle. The arm member rotatably supports the wheel and comprises a side section with a through hole formed therein. The through hole extends in a vehicle width direction and is formed to adjust rigidity of the arm member.

In the above-described arm member, the size, position and the like of the through hole are used to adjust the rigidity of the arm member. More particularly, the rigidity of the arm member can be reduced. Thus, the rigidity of the arm member is easily adjusted without having to change the shape of the arms or the like.

In one embodiment, when the arm member is attached to the vehicle and in use, the through hole is formed at a position that is generally at a center of twist occurring in the arm member.

In another embodiment, the arm member extends in a front-rear direction of the vehicle when attached to the vehicle. A wheel axle support hole is formed in the arm member. The through hole is continuous with the wheel axle support hole, and a width of the through hole in the upward-downward direction is smaller than that of the wheel axle support hole.

In another embodiment, the through hole is closer to the pivot member than is the wheel axle support hole.

A straddle-type vehicle according to a further embodiment is provided with the arm member according to the second aspect of the invention.

The present invention provides an arm member for a straddle-type vehicle that satisfies rigidity requirements and is manufactured more easily.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 1:
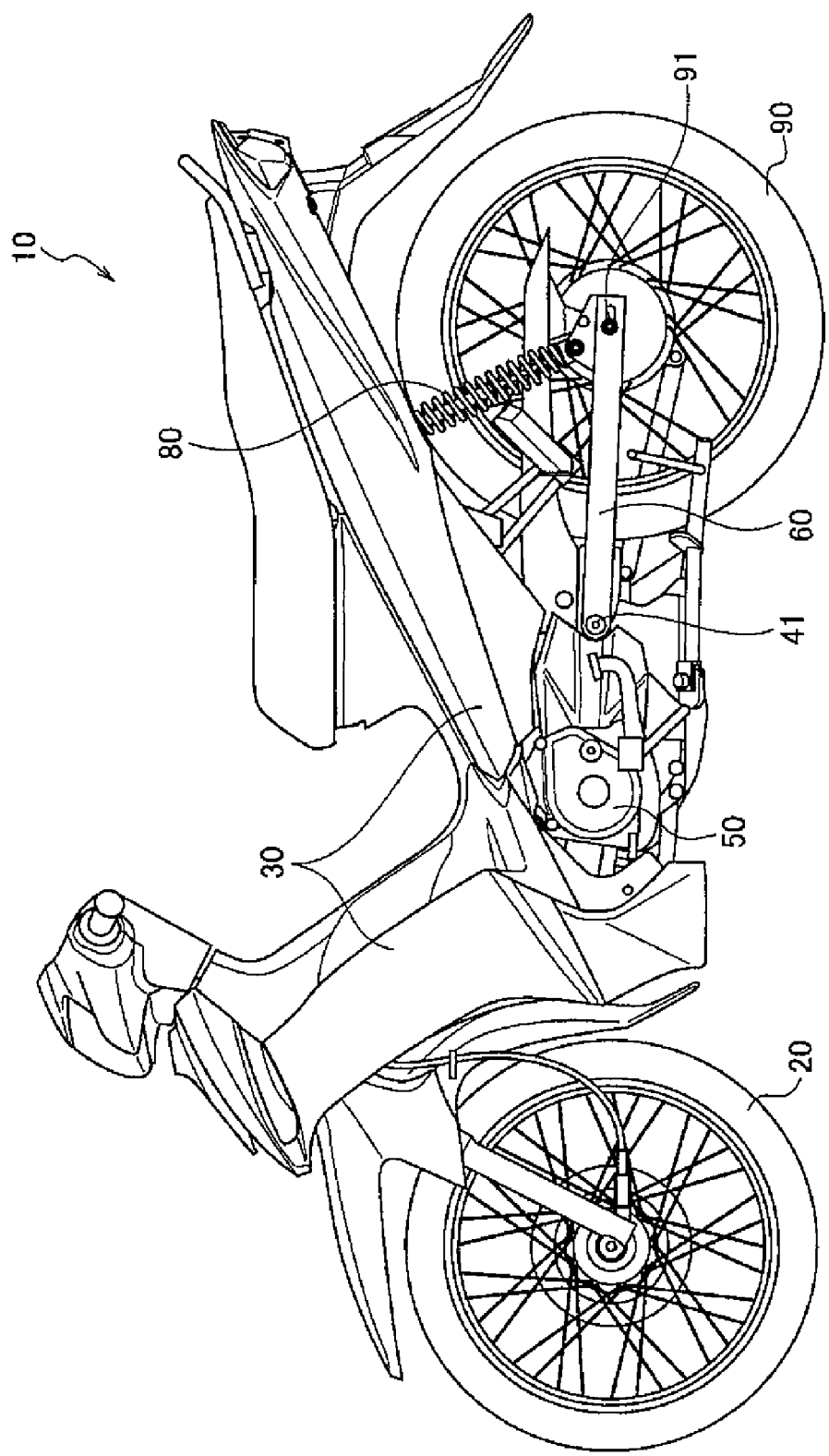
FIG. 1 is a left side view of a motorcycle according to an embodiment of the invention.

An embodiment of a straddle-type vehicle according to the invention is now described with reference to the drawings. In the drawings, structural members that are the same or similar are denoted with the same or similar reference numerals. The drawings are schematic, and thus the relative scale of dimensions and the like may be different from the real object. Specific dimensions and the like can be determined based on reference to the following description. In addition, the relationship and scale of respective dimensions and the like may vary from figure to figure.

(Outline of the Overall Structure of the Straddle-Type Vehicle)

Figure 2:
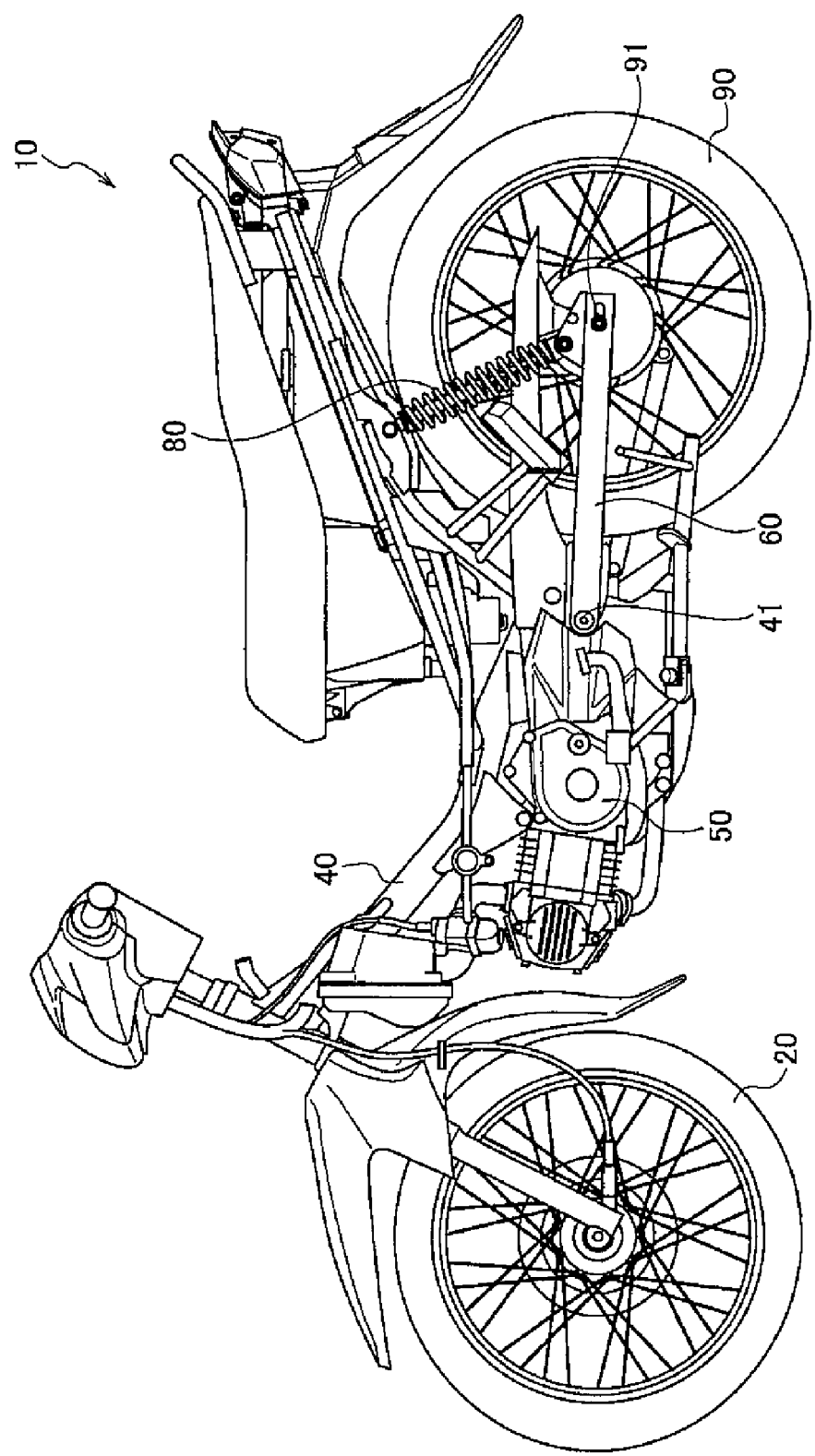
FIG. 2 is a left side view of the motorcycle with a vehicle body cover removed.

FIG. 1 is a left side view of a motorcycle 10 which is a straddle-type vehicle according to an embodiment of the invention. FIG. 2 is a left side view of motorcycle 10 with a body cover 30 removed. Motorcycle 10 is an underbone motorcycle that has a body frame 40 that is disposed further downwards as compared to a standard straddle-type motorcycle. Motorcycle 10 has a front wheel 20 and a rear wheel 90 driven by driving force generated by an engine 50.

Rear wheel 90 includes a wheel axle 91 that is supported by a rear arm 60. Rear arm 60 is attached to a pivot member 41 that is provided on body frame 40. Rear arm 60 is able to swing generally upward and downward centering on pivot member 41. More particularly, rear arm 60 rotatably supports rear wheel 90. In this embodiment, rear arm 60 forms an arm member. A rear end of rear arm 60 is connected to a rear cushion unit 80. Rear cushion unit 80 is also connected to body frame 40 and dampens shock that is applied to rear arm 60 via rear wheel 90.

(Structure of the Arm Member)

Figure 3:
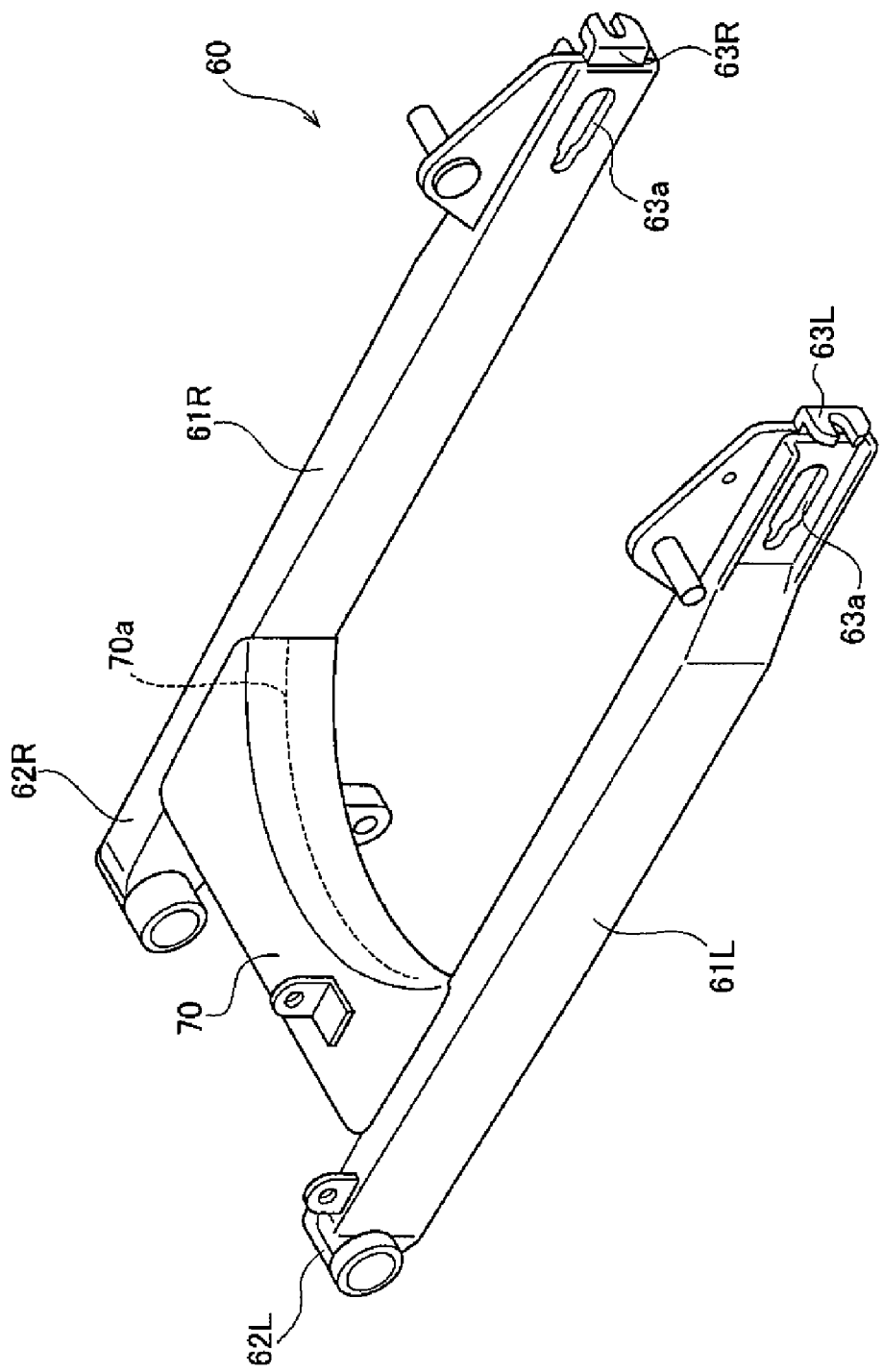
FIG. 3 is a perspective view of an arm member unit according to an embodiment of the invention.
Figure 4:
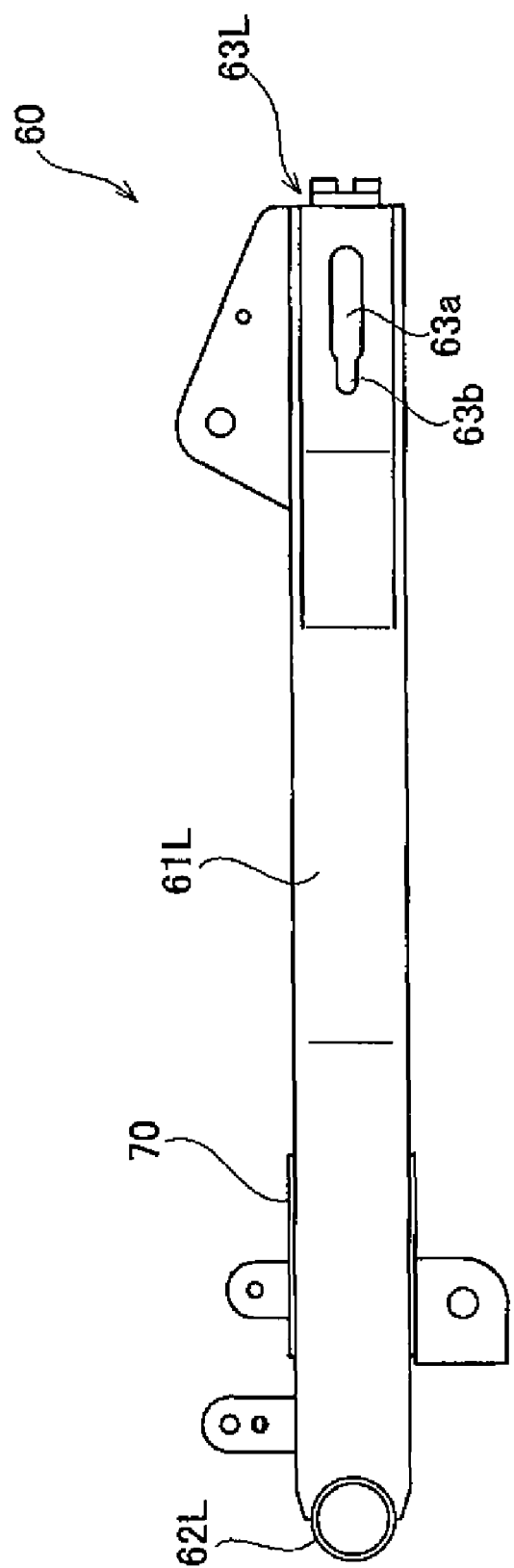
FIG. 4 is a left side view of the arm member.
Figure 5:
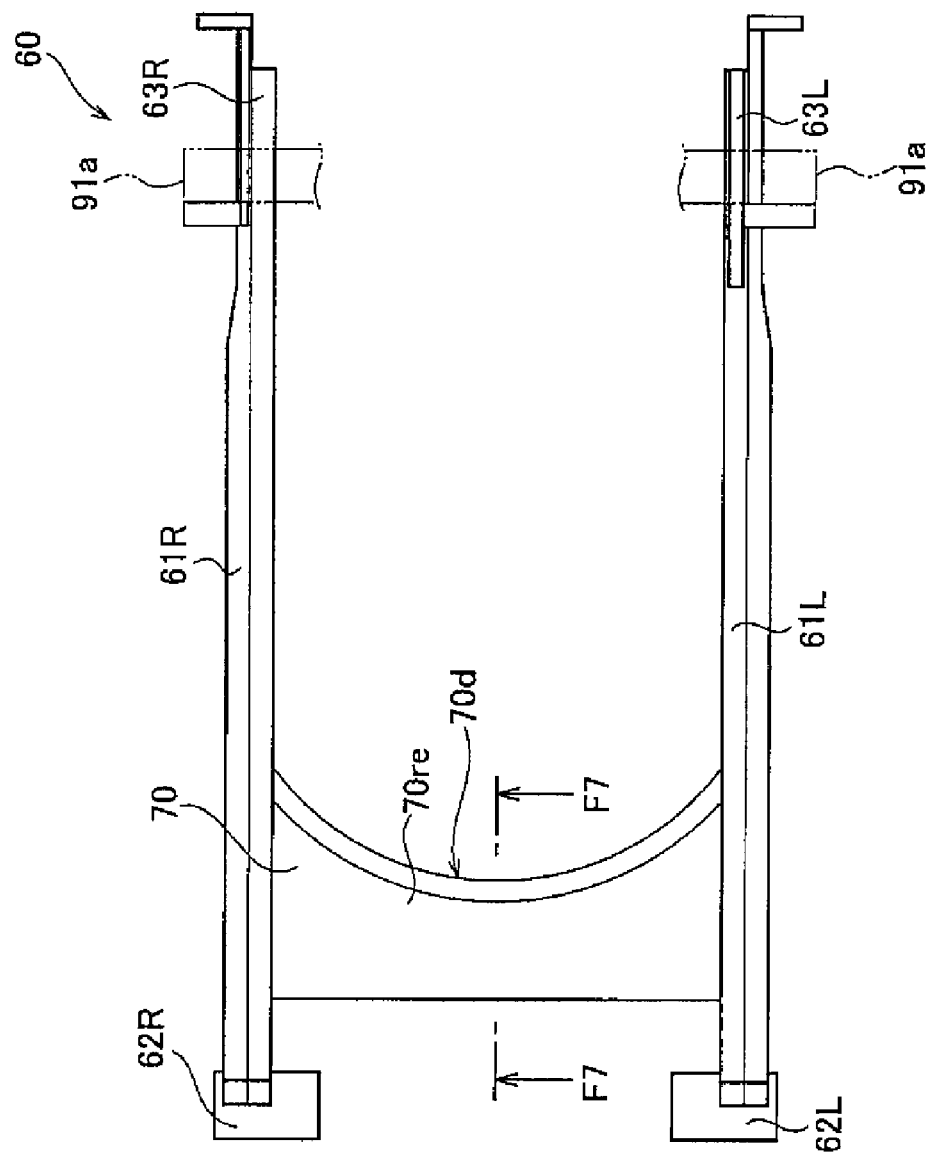
FIG. 5 is a plan view of the arm member.

The structure of rear arm 60 is now explained. FIG. 3 is a perspective view of the rear arm 60 unit. FIG. 4 is a left side view of rear arm 60. FIG. 5 is a plan view of rear arm 60. As can be seen, rear arm 60 is formed by arms 61L, 61R, and a cross member 70. Rear arm 60 extends in a front-rear direction when attached to motorcycle 10.

Arms 61L, 61R respectively support end sections 91a (FIG. 5) of wheel axle 91. In this embodiment, arms 61L, 61R form a pair of arms. More specifically, a wheel axle support member 63L (63R) is provided in a rear end of arm 61L (61R). A wheel axle support hole 63a that supports end section 91a of wheel axle 91 is formed in wheel axle support member 63L (63R). Pivot attachment members 62L, 62R formed in front end of arms 61L, 61R are swingably attached (refer to FIG. 1 and FIG. 2) to pivot member 41.

A rigidity adjustment hole 63b formed continuously with wheel axle support hole 63a is used to adjust the rigidity of rear arm 60. More particularly, rigidity adjustment hole 63b allows the rigidity of rear arm 60 to be reduced.

Rigidity adjustment hole 63b is formed as a through hole and extends in the vehicle width direction of motorcycle 10. Rigidity adjustment hole 63b is formed at a position that is substantially at the center of twist that occurs in rear arm 60 when rear arm 60 is attached to motorcycle 10 and in use. Rigidity adjustment hole 63b is closer to pivot attachment members 62L, 62R than is wheel axle support hole 63a.

As can be seen from FIG. 4, the width in the upward-downward (vertical) direction of rigidity adjustment hole 63b is less than that of wheel axle support hole 63a. Wheel axle 91 is thus fixed by wheel axle support hole 63a and cannot enter into rigidity adjustment hole 63b.

Cross member 70 is provided between and connects arms 61L and 61R. In this embodiment, cross member 70 forms a connecting member. A rear end section 70re of cross member 70 has a recessed section 70d that is recessed toward pivot member 41 in a plan view. Thus, rear end section 70re has an arch shape in a plan view (FIG. 5).

Figure 6:
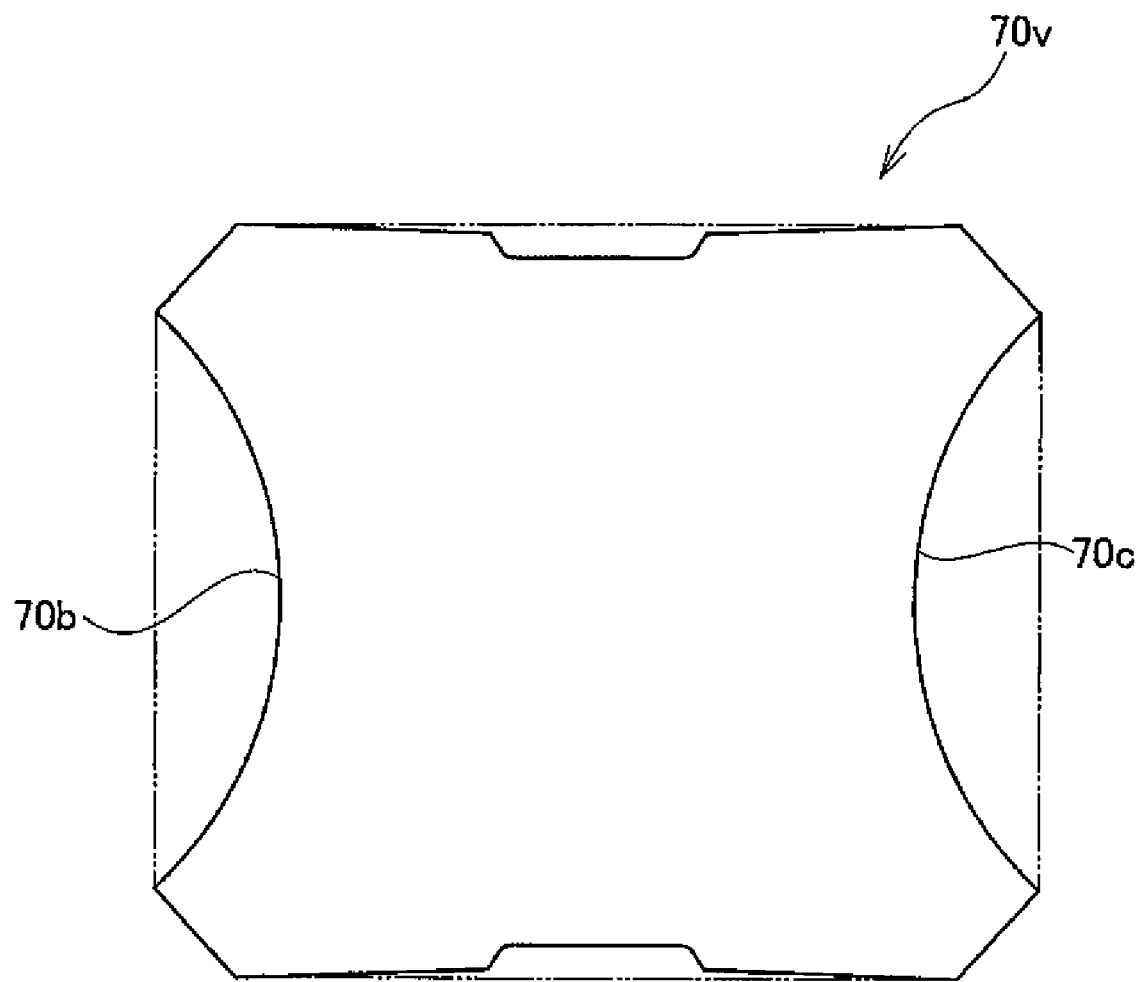
FIG. 6 shows an extended state of a connecting member according to an embodiment of the invention.

FIG. 6 shows an extended state of cross member 70. As shown in FIG. 6, cross member 70 is formed by bending a single tabular member 70V. One end section 70b of tabular member 70V is bent to abut against the other end section 70c.

Figure 7:
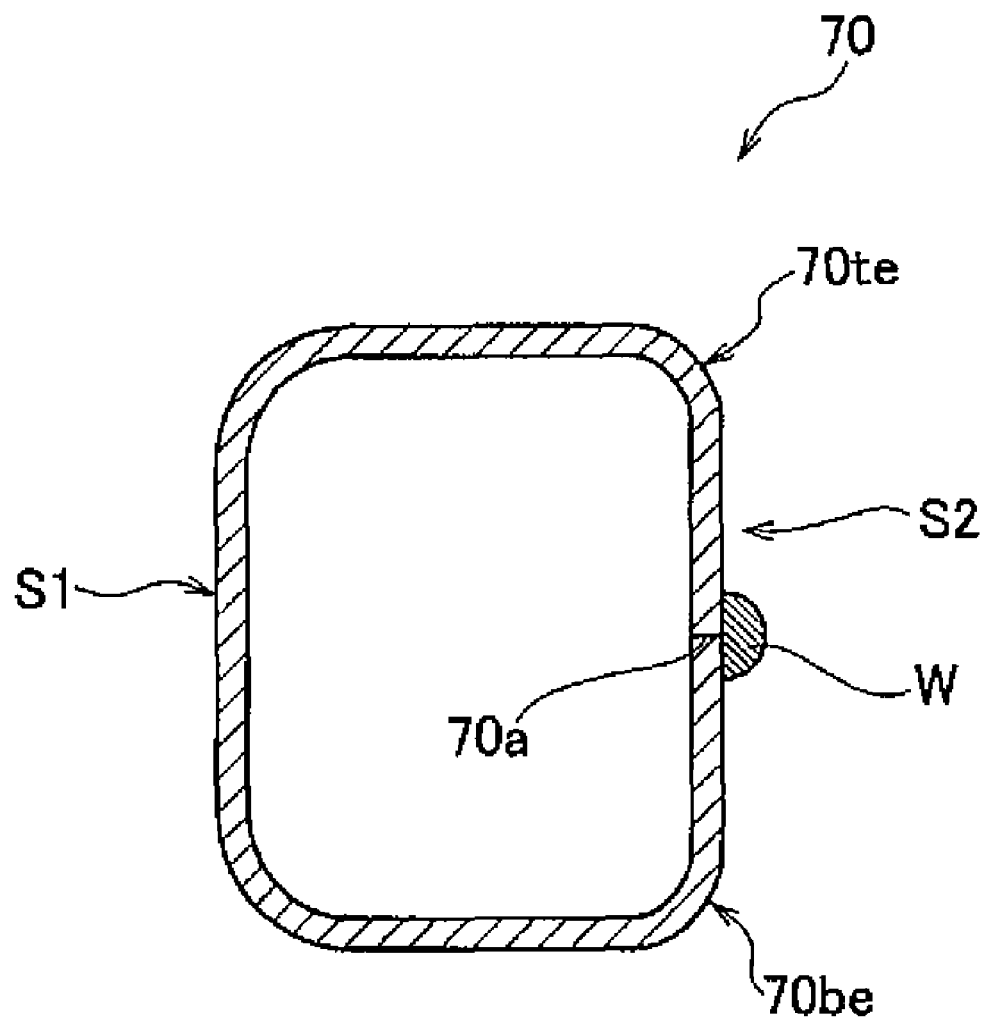
FIG. 7 is a cross sectional view of the connecting member along line F7-F7 of FIG. 5.

As can be seen from FIG. 7, which is a cross sectional view of cross member 70 along line F7-F7 of FIG. 5, an abutting section 70a facing wheel axle 91 is formed in a rear surface S2 of cross member 70. In this embodiment, rear surface S2 forms a wheel axle facing surface. A front surface S1 faces pivot member 41 and forms a pivot facing surface.

Abutting section 70a is formed generally centrally between a top end 70te and a bottom end 70be of rear surface S2. A welded bead W is formed by welding at abutting section 70a, and more particularly at an abutting section of end section 70b and end section 70c of tabular member 70V. As shown in FIG. 3, abutting section 70a extends between arms 61R and 61L.

(Operation & Advantages)

In rear arm 60, cross member 70 is formed by bending single tabular member 70V. As a result, as compared to formation of cross member 70 using a plurality of members, the manufacturing process of rear arm 60 is simplified.

Furthermore, rear end section 70re of cross member 70 has recessed section 70d that is recessed toward pivot member 41. More particularly, recessed section 70d has an arch shape. Accordingly, interference with wheel axle 91 is avoided, and the rigidity required of rear arm 60 is ensured. More specifically, since rear end section 70re is arch shaped, concentration of stress at a particular point of cross member 70 is inhibited.

In this embodiment, abutting section 70a of cross member 70 is formed in rear surface S2 that faces wheel axle 91 and extends between arms 61L and arm 61R. Abutting section 70a is formed generally centrally between top end 70te and bottom end 70be of rear surface S2. As a result, as compared to a structure in which abutting section 70a is formed in an upper surface or a lower surface of cross member 70, the rigidity of cross member 70 and rear arm 60 is increased.

In addition, the rigidity of rear arm 60 can be adjusted using the size and the position of rigidity adjustment hole 63b. More particularly, the rigidity of rear arm 60 can be reduced. Thus, the rigidity of rear arm 60 is easily adjusted without having to change the shape of arms 61L, 61R or the like.

In this embodiment, rigidity adjustment hole 63b is formed at a position that is substantially at the center of twist generated in rear arm 60 when rear arm 60 is attached to motorcycle 10 and in use. As a result, the rigidity of rear arm 60 can be efficiently adjusted.

In this embodiment, rigidity adjustment hole 63b is continuous with wheel axle support hole 63a, and the width of rigidity adjustment hole 63b in the upward-downward direction is less than that of wheel axle support hole 63a. Therefore, wheel axle support hole 63a and rigidity adjustment hole 63b can be formed in an integrated manner, thus simplifying the manufacturing process of rear arm 60. Because the width of rigidity adjustment hole 63b in the upward-downward direction is less than that of wheel axle support hole 63a, wheel axle 91 that is inserted into wheel axle support hole 63a cannot enter into rigidity adjustment hole 63b. Moreover, rigidity adjustment hole 63b is closer to pivot member 41 side than is wheel axle support hole 63a. As a result, rigidity adjustment hole 63b is formed in the vicinity of the position that is generally at the center of twist generated in rear arm 60 when rear arm 60 is attached to motorcycle 10 and in use.

(Other Embodiments)

One embodiment of the invention has been described to disclose the features of the invention. However, the invention is not limited by the description and drawings that constitute one section of the disclosure. As will be apparent to those skilled in the art, various modified forms of the invention are possible.

Figure 8:
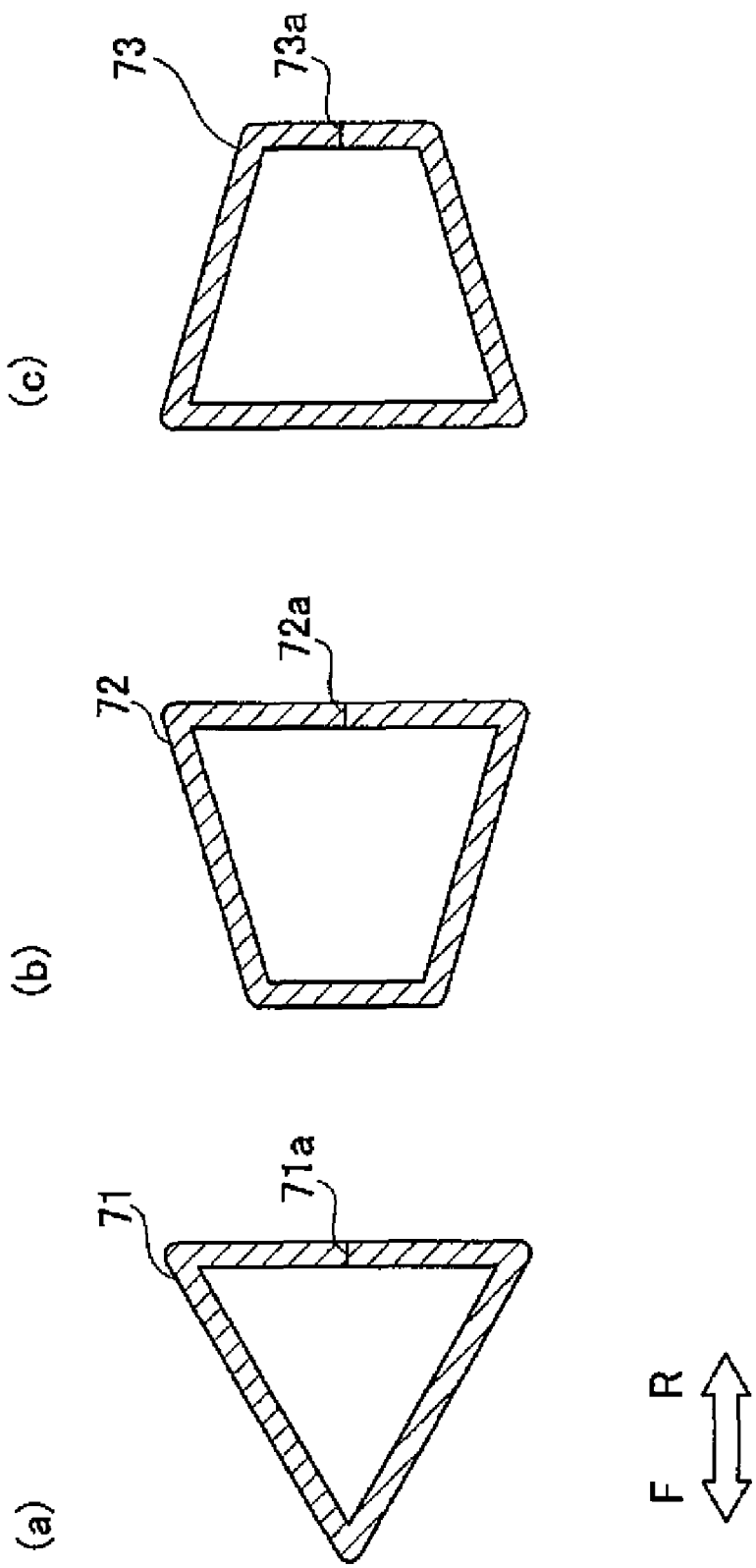
FIGS. 8(*a*)-8(*c*) are cross sectional views of a connecting member according to modified embodiments of the invention.

For example, while the cross sectional shape of cross member 70 has been described as a square shape (FIG. 7), it does not have to be a square shape. FIGS. 8(a)-(c) show modified forms 71-73 that can replace cross member 70. Cross member 71 of FIG. 8(a) has a triangular cross sectional shape. An abutting section 71a of cross member 71 is formed on the rear (R) side of motorcycle 10, namely, in the surface that faces wheel axle 91. Cross members 72, 73 of FIGS. 8(b) and 9(c) have a trapezoidal cross sectional shape. An abutting section 72a of cross member 72 and an abutting section 73a of cross member 73 are formed at the rear (R) side of motorcycle 10. Abutting sections 71a-73a are welded like abutting section 70a.

Abutting section 70a has been described as formed in rear surface S2 (the surface that faces the wheel axle). However, abutting section 70a may instead be formed in front surface S1 (the surface that faces the pivot). In addition, abutting section 70a does not have to extend between arms 61L and 61R.

Rear end section 70re of cross member 70 has been described as having an arch shape. However, this is not necessary, and it is sufficient that rear end section 70re has a recessed shape that is recessed toward pivot member 41 in a plan view.

Rigidity adjustment hole 63b has been described as continuous with wheel axle support hole 63a. However, this is not necessary. In addition, rigidity adjustment hole 63b may be formed in a rear arm that uses a cantilever structure.

The description herein focuses on the example of rear arm 60. However, the invention may of course be applied to an arm that can swing like rear arm 60 but is provided on the front wheel.

As will be readily apparent, the invention includes various modified embodiments not described herein. Accordingly, the scope of the invention is defined by the features set forth in the following claims.

The invention claimed is:
1. A vehicle comprising:
a vehicle body frame including a pivot member;
a wheel supported by a wheel axle; and
an arm member including a pair of arms and a connecting member disposed between and connecting the pair of arms, the connecting member including one or more brackets; and
a cushion unit arranged to connect a rear end portion of the pair of arms to the vehicle body frame; wherein
the rear end portion of the pair of arms is arranged to support end sections of the wheel axle, and a front end portion of the pair of arms is connected to the pivot member of the vehicle body frame;
the connecting member is connected to the vehicle body frame via the pair of arms, the connecting member includes a rear end section including a recessed section that is recessed toward the pivot member in a plan view of the vehicle, and the recessed section includes a rear surface that is opposed to the wheel axle;
the connecting member is defined by a tabular member including one end section bent to abut against another end section of the tabular member in an abutting section of the rear surface that opposes the wheel axle;
the one end section and the another end section are opposed to each other without projecting toward the wheel axle and are connected to each other via a weld;
the rear surface includes first and second connections connecting the connecting member and the pair of arms at a rearward most portion of the connecting member, the first and second connections are defined by vertical straight lines, and the weld extends from the first connection to the second connection; and
none of the one or more brackets extends rearward from the rear surface of the connecting member.

2. The vehicle according to claim 1, wherein the rear end section of the connecting member has an arch shape in the plan view.

3. The vehicle according to claim 1, wherein the abutting section extends between the pair of arms.

4. The vehicle according to claim 1, wherein the abutting section is formed at a substantially central position between top and bottom ends of the connecting member.

5. The vehicle according to claim 1, wherein the rear end portion of the pair of arms includes wheel axle support members arranged to support the end sections of the wheel axle, and the front end portion of the pair of arms include pivot attachment members positioned furthest from the wheel axle support members to attach the pair of arms to the pivot member.

* * * * *